US005248561A

United States Patent [19]

Fujiwara et al.

[11] Patent Number: 5,248,561

[45] Date of Patent: Sep. 28, 1993

[54] THERMAL TRANSFER SHEET FOR REPEATED PRINTING CYCLES

[75] Inventors: Tetsuya Fujiwara; Masashi Narita, both of Tokyo, Japan

[73] Assignee: Dai Nippon Printing Co., Ltd., Japan

[21] Appl. No.: 857,429

[22] Filed: Mar. 24, 1992

[30] Foreign Application Priority Data

Mar. 26, 1991 [JP] Japan .................................. 3-84434

[51] Int. Cl.[5] .................................................. B32B 9/00

[52] U.S. Cl. ................................ 428/488.1; 428/195; 428/202; 428/212; 428/327; 428/407; 428/522; 428/913; 428/914

[58] Field of Search ..................... 428/195, 212, 488.1, 428/488.4, 913, 914, 207, 211, 484, 423.1, 480; 427/256

[56] References Cited

U.S. PATENT DOCUMENTS

| | | | |
|---|---|---|---|
| 4,564,534 | 1/1986 | Kushida et al. | 428/207 |
| 5,002,819 | 3/1991 | Tohma et al. | 428/195 |
| 5,106,676 | 4/1992 | Sato et al. | 428/195 |

*Primary Examiner*—Patrick J. Ryan
*Assistant Examiner*—W. Krynski
*Attorney, Agent, or Firm*—Parkhurst, Wendel & Rossi

[57] ABSTRACT

A thermal transfer sheet for repeated printing cycles, including a first ink layer and a second ink layer provided in that order on one surface of a substrate film and transferable upon being heated, wherein the first ink layer and the second ink layer each include a binder and a colorant, and the time taken for the first ink layer to solidify after melting is different from and shorter than that for the second ink layer.

7 Claims, No Drawings

THERMAL TRANSFER SHEET FOR REPEATED PRINTING CYCLES

BACKGROUND OF THE INVENTION

The present invention relates to a thermal transfer sheet. More particularly, the present invention is concerned with a thermal transfer sheet which enables repeated printing cycles to be conducted in an identical region.

In an output print of a computer or a word processor by a thermal transfer system, use has hitherto been made of a thermal transfer sheet wherein a heat-meltable ink layer was provided on one surface of a substrate film.

The conventional thermal transfer sheet is produced by coating a heat-meltable ink layer of a mixture of a wax with a colorant, such as a pigment or a dye, on a substrate film comprising a paper such as a condenser paper or a paraffin paper having a thickness of 10 to 20 μm or a film of plastic such as polyester or cellophane. The most serious problem of the thermal transfer sheet is that printing can be conducted only once in an identical region, which is very disadvantageous from the viewpoint of economy. Specifically, in the case of an ink ribbon for a typewriter comprising a commonly used fabric tape impregnated with an ink, printing can be conducted twice or more in an identical region. On the other hand, in the case of a thermal transfer sheet, since the whole ink layer is transferred by single printing, printing cannot be conducted twice or more in an identical region, so that the substrate sheet used in a thermal transfer sheet is discarded after it is used only once. The amount of an ink actually transferred in a transfer material occupies only several %, ten-odd % at the highest of the whole ink, and the remaining majority part of the ink is discarded without use.

Accordingly, an object of the present invention is to solve the above-described problem and to provide a thermal transfer sheet which enables printing to be conducted twice or more in an identical region.

DISCLOSURE OF THE INVENTION

The above-described object can be attained by the following present invention.

The thermal transfer sheet for repeated printing cycles according to the present invention comprises a first ink layer and a second ink layer provided in that order on one surface of a substrate film and being transferable upon being heated, wherein said first ink layer and said second ink layer each comprise a binder and a colorant, the time taken for said first ink layer to solidify after melting being different from and shorter than that for said second ink layer.

In order to make repeated printing cycles possible, it is considered to use, for example, a method which comprises putting two ink layers different from each other in melting point or thermal deformation temperature on top of each other, transferring only the ink layer of the surface layer in the first printing and transferring the underlying ink in the second printing. This method, however, is not always useful. The present inventor has found that only the second ink layer can be transferred by melting both the first and second ink layers at the time of heating by means of a thermal head in the first printing and utilizing the difference in the solidification time between the first and second ink layers. Specifically, a thermal transfer sheet for repeated printing cycles can be prepared by constructing a laminate structure of ink layers in such a manner that although both the first and second ink layers are melted by heat of the thermal head in the first printing, when the supply of the heat by means of the thermal head is stopped, the first ink layer immediately solidifies with the solidification of the second ink layer being delayed. More specifically, in the first printing, only the second ink layer in contact with an image receiving sheet is satisfactorily transferred in the first printing due to a difference in the solidification rate between the first and second ink layers with the first ink layer remaining untransferred on the side of the substrate. It enables the first ink layer to be used in the ink layer for the second printing.

BEST MODE FOR CARRYING OUT THE INVENTION

The present invention will now be described in more detail with reference to the following preferred embodiments.

The same substrate film as that used in the conventional thermal transfer sheet, as such, may be used as the substrate film in the present invention, and other known materials may be properly used.

Preferred examples of the substrate film include plastic films such as polyester, polypropylene, cellophane, polycarbonate, cellulose acetate, polyethylene, polyvinyl chloride, polystyrene, nylon, polyimide, polyvinylidene chloride, polyvinyl alcohol, fluororesins, chlorinated rubber and ionomer, papers such as condenser paper and paraffin paper, and unwoven fabrics. It is also possible to use a substrate film comprising a combination of the above-described materials.

The thickness of the substrate film can be properly varied depending upon the material so that the strength and the heat conductivity become proper. For example, the thickness is preferably in the range of from 2 to 25 μm.

In the present invention, two ink layers different from each other in the time of solidification after melting are put on the surface of the substrate film. The solidification time for the two ink layers may be properly adjusted according to the type of the binder used.

In the present invention, the solidification time can be utilized mainly by the following method. Specifically, the compositions respectively constituting the first ink layer and the second ink layer are once brought into a molten state (120° C.) and allowed to cool at a rate of 7.5° C./min to measure the time taken for the compositions to solidify. This time can be defined as the solidification time. The solidification time of the first ink layer is preferably 8 min or less as measured by the above-described method.

The difference in the solidification time between the first ink layer and the second ink layer is preferably in the range of from 4 to 8 min as measured in terms of a time taken for the composition to solidify from the molten state (120° C.) when it is cooled at a rate of 7.5° C./min.

A binder for the first ink layer is preferably composed mainly of a wax having a higher solidification rate than that of the second ink layer, while a binder for the second ink layer is preferably composed mainly of a plasticized thermoplastic resin having a lower solidification rate than that of the first ink layer.

In a preferred embodiment, the first ink layer comprises a colorant and the above-described vehicle (binder) and, if necessary, various additives.

In this case, the colorant is preferably a dye having properties suitable as a recording material among organic or inorganic pigments or dyes, for example, a dye having a sufficient coloring density and less liable to color change to brown upon being exposed to light, heat, temperature or the like. Further, the colorant may be a substance which is colorless in a non-heated state but colors upon being heated or brought into contact with a substance coated on a transfer material. It is also possible to use, besides colorants capable of forming cyan, magenta, yellow and black, colorants for various other colors.

The vehicle for the first ink layer is composed mainly of a wax, and preferably a mixture of a wax with a drying oil, a resin, a mineral oil, cellulose, a rubber derivative or the like. Representative examples of the wax include microcrystalline wax, carnauba wax and paraffin wax. Further, it is also possible to use various waxes such as Fischer-Tropscj wax, various types of low molecular weight polyethylene, wood wax, beeswax, spermaceti wax, Chinese wax, wool wax, ceramic wax, candelilla wax, petrolatum, partially modified wax, fatty acid esters and fatty acid amides. In order to impart good heat conductivity and melt transferability to the first ink layer, it is possible to incorporate a heat conductive substance in the heat-meltable ink. Examples of such a substance include carbonaceous substances such as carbon black, aluminum, copper, tin oxide and molybdenum disulfide.

A preferred embodiment of the second ink layer will now be described.

The colorant used is the same as the colorant for the first ink layer, and the amount thereof is preferably in the range of from 10 to 30 parts by weight based on 100 parts by weight of the plasticized resin.

Examples of the thermoplastic resin include an ethylene/vinyl acetate copolymer (EVA), an ethylene/acrylic ester copolymer (EEA), polyethylene, polystyrene, polypropylene, polybutene, a petroleum resin, a vinyl chloride resin, a vinyl chloride/vinyl acetate copolymer, polyvinyl alcohol, a vinylidene chloride resin, a methacrylic resin, polyamide, polycarbonate, a fluororesin, polyvinyl formal, polyvinyl butyral, acetyl cellulose, nitrocellulose, polyvinyl acetate, polyisobutylene, ethyl cellulose, PVA and polyacetal. Among them, nitrocellulose is particularly preferred. When a second ink layer is formed by using nitrocellulose as a main component and adding thereto a colorant, such as carbon black, and a plasticizer, the transfer from the first ink layer becomes good in the printing and the disconnection from the non-printing portion becomes good, so that it becomes possible to obtain a high-quality print having a high density and a high sharpness.

In this case, it is preferred to properly select a plasticizer having a high compatibility with the thermoplastic resin. Specific examples of the plasticizer include phthalic ester plasticizers such as dimethyl phthalate, diethyl phthalate, dibutyl phthalate, dioctyl phthalate, diphenyl phthalate, dinonyl phthalate and dicyclohexyl phthalate, phosphoric ester plasticizers such as triethyl phosphate, tributyl phosphate, tricresyl phosphate, trioctyl phosphate, triphenyl phosphate, 2-ethylhexyldiphenyl phosphate and cresyldiphenyl phosphate, adipic acid ester plasticizers such as dioctyl adipate, n-octyl n-decyl adipate and n-heptyl n-nonyl adipate, sebacic acid ester plasticizers such as dibutyl sebacate, dioctyl sebacate, diisooctyl sebacate and butyl benzyl sebacate, azelaic acid ester plasticizers such as dioctyl azelate, dihexyl azelate and diisooctyl sebacate, citric acid ester plasticizers such as triethyl citrate, acetyltriethyl citrate, tributyl citrate, acetyltributyl citrate and acetyltrioctyl citrate, glycolic acid ester plasticizers such as methyl phthalyl ethyl glycolate, ethyl phthalyl ethyl glycolate and butyl phthalyl butyl glycolate and epoxy plasticizers such as epoxidized soybean oil, butyl epoxy stearate and octyl epoxy hexahydrophthalate, and further high molecular weight plasticizers such as polyester plasticizers having a molecular weight of 1000 to 10000 comprising a dibasic acid, such as sebacic acid, adipic acid or phthalic acid, and various glycols and high molecular weight polyester plasticizers having a terminal modified with a long-chain alcohol, fatty acid, carboxyl-modified silicone or alcohol-modified silicone. In particular, a plasticizer which is solid at room temperature is favorable because it reduces the migration to the reverse face and has a favorable effect on the storage stability of a ribbon. Among them, dioctyl phthalate, diphenyl phthalate and triphenyl phosphate are particularly preferred for the nitrocellulose resin. The amount of addition of the plasticizer is preferably in the range of from 3 to 100 parts by weight based on 100 parts by weight of the nitrocellulose resin. The above-described plasticizer can plasticize the thermoplastic resin.

The first and second ink layers comprising the above-described components can be formed on the substrate film by hot melt coating, hot lacquer coating, gravure coating, gravure reverse coating and many other known coating methods. It is also possible to use methods wherein use is made of an aqueous or non-aqueous emulsion.

The thickness of the ink layer is preferably about 3 to 15 μm for the first ink layer and 0.2 to 6 μm for the second ink layer.

According to a preferred embodiment of the present invention, an adhesive layer may be provided between the first ink layer and the substrate film. The adhesive layer is formed through the use of the above-described thermoplastic resin so as to have a thickness of 0.5 to 3 μm. The provision of the adhesive layer contributes to an adhesion between the substrate film and the first ink layer, which makes it possible to transfer the first ink layer together with the second ink layer to be more effectively prevented in the second pringting.

In the present invention, an uncolored surface layer comprising the above-described wax may be formed on the surface of the ink layers. The provision of the surface layer is advantageous for preventing the greasing of an image receiving sheet at the time of printing. In this case, the thickness of the surface layer is preferably about 0.1 to 5 μm for the purpose of preventing the occurrence of a lack of sensitivity, for example, even in the case of use in a high speed printer wherein the printing energy is low. When the thickness of the surface layer is less than 0.1 μm, there is a tendency that the effect of preventing the greasing becomes poor. A suitable amount of an extender pigment or a white pigment may be added to the surface layer for coloration of the surface layer to white.

When a material having poor heat resistance is used for the substrate film, it is preferred to provide a layer for preventing sticking of the thermal head on a surface which comes into contact with the thermal head. The anti-stick layer is mainly composed of a heat-resistant resin and a substance capable of serving as a heat release agent or a lubricant. A synthetic resin having a glass transition point of 60° C. or above or a thermoplastic resin having a OH group or a COOH group subjected to curing by crosslinking to a small degree through the addition of a compound having two amino groups or a diisocyanate or a triisocyanate are favorable as the heat-resistant resin. The heat release agent or lubricant is classified into two groups, i.e., substances such as wax and an amide, an ester and a salt of a higher fatty acid, etc., which melt and exhibit their function upon being heated, and substances, such as a fluororesin and a powder of an inorganic substance, which exhibit their function in the form of a solid. The provision of such an anti-stick layer enables thermal printing to be conducted without sticking even in the case of a thermal transfer sheet comprising a plastic film having poor heat resistance, thus enabling advantages inherent in a plastic film, such as less liability to breaking and good formability, to be usefully utilized.

It is needless to say that the present invention can be applied to a thermal transfer sheet for color printing. Therefore, a thermal transfer sheet for multicolor printing as well falls within the scope of the present invention. Further, thermal transfer printers to which the thermal transfer sheet of the present invention is applied may be any of line type and serial type printers.

The present invention will now be described in more detail with reference to the following Examples and Comparative Examples. "parts" or "%" in the Examples and Comparative Examples is by weight unless otherwise specified.

EXAMPLE 1

A polyethylene terephthalate film having a thickness of 4.5 μm was used as a substrate film, and an ink having the following composition for a mat layer was printed on one surface of the substrate film at a coverage of 0.3 g/m2 (on a dry basis) to form a mat layer. Then, a first ink having the following composition was printed on the mat layer at a coverage of 10 $g/m^2$ by means of a roll coater, and a second ink layer was coated thereon at a coverage of 0.3 $g/m^2$ (on a dry basis) by means of a gravure roll, thereby preparing a thermal transfer sheet for repeated printing cycles.

The composition constituting the ink layer was once melted (at 120° C.) and allowed to cool at a rate of 7.5° C./min to measure a time taken for the composition to solidify, and this time was defined as the solidification time.

Ink composition for mat layer

| | |
|---|---|
| Vylon 200 (manufactured by Toyobo Co., Ltd.) | 15 parts |
| Carbon black (#25 manufactured by Mitsubishi Chemical Industries, Ltd.) | 5 parts |
| Solvent (MEK/toluene = 1/1) | 80 parts |

Composition for first ink layer

A composition for a transfer ink having the following composition was prepared by dispersion for 2 hr by means of a sand mill while heating at 90° C.

| | |
|---|---|
| Carnauba wax (HNP-10) | 10 parts |
| Ethylene/vinyl acetate copolymer (Evaflex 410) | 5 parts |
| Paraffin wax (paraffin 150F) | 65 parts |
| Carbon black (#25 manufactured by Mitsubishi Chemical Industries, Ltd.) | 20 parts |

-continued

The solidification time was 6 min.

Composition for second ink layer

| | |
|---|---|
| Pyroxylin (H1/8 manufactured by Asahi Chemical Industry Co., Ld.) | 50 parts |
| DOP | 25 parts |
| Carbon black | 15 parts |
| Solvent (ethyl acetate/toluene/IPA = 2/2/1) | 250 parts |

The solidification time was 11.5 min.

EXAMPLE 2

The thermal transfer sheet for repeated printing cycles according to the present invention was prepared in the same manner as that of Example 1, except that the second ink layer had the following composition.

Composition for second ink layer

| | |
|---|---|
| Styrene/acrylic copolymer resin (S-180 manufactured by Nippon Carbide Industries Co., Ltd.) | 50 parts |
| DPP | 10 parts |
| Carbon black | 12 parts |
| Solvent (ethyl acetate/toluene/IPA = 2/2/1) | 210 parts |

The solidification time was 11 min.

EXAMPLE 3

The thermal transfer sheet for repeated printing cycles according to the present invention was prepared in the same manner as that of Example 1, except that the second ink layer had the following composition.

Composition for second ink layer

| | |
|---|---|
| Styrene resin | 50 parts |
| TPP | 50 parts |
| Carbon black | 25 parts |
| Solvent (ethyl acetate/toluene/IPA = 2/2/1) | 300 parts |

The solidification time was 14 min.

EXAMPLE 4

The thermal transfer sheet for repeated printing cycles according to the present invention was prepared in the same manner as that of Example 1, except that the second ink layer had the following composition.

Composition for second ink layer

| | |
|---|---|
| Pyroxylin | 20 parts |
| Silicone-modified polyester plasticizer | 20 parts |
| Carbon black | 40 parts |
| Solvent (ethyl acetate/toluene/IPA = 2/2/1) | 200 parts |

The solidification time was 12 min.

COMPARATIVE EXAMPLE 1

A comparative thermal transfer sheet was prepared in the same manner as that of Example 1, except that no second ink layer is formed.

COMPARATIVE EXAMPLE 2

A comparative thermal transfer sheet was prepared in the same manner as that of Example 1, except that the same first ink layer (solidification time: 6 min) as that of Example 1 was formed and the following second ink layer was then formed.

Composition for second ink layer

| | |
|---|---|
| Pyroxylin | 20 parts |
| Carbon black | 10 parts |
| Solvent (ethyl acetate/toluene/ IPA = 2/2/1) | 100 parts |

The solidification time was 5 min.

APPLICATION EXAMPLE

Printing was conducted twice in an identical position of the thermal transfer sheets prepared in the above-described Examples and Comparative Examples under the following printing conditions, and the image density was measured. The results are given in Table 1.

Printing conditions

Device used: Toshiba simulator equipped with thin film type thermal head

Printing energy: 0.8 mj/dot (constant)

Transfer material: wood free paper (KYP duodecimo 125KG manufactured by Sanyo Kokusaku Pulp Co., Ltd.)

TABLE 1

| | Printing Density | |
|---|---|---|
| Ex. No. | 1st printing | 2nd printing |
| Ex. 1 | 1.3 | 1.2 |
| Ex. 2 | 1.2 | 1.2 |
| Ex. 3 | 1.2 | 1.1 |
| Ex. 4 | 1.3 | 1.2 |
| Comp. Ex. 1 | 1.5 | 0.4 |
| Comp. Ex. 2 | 1.4 | 0.2 |

As described above, according to the present invention, thermal transfer sheets for repeated printing cycles which enable a good print having a high density and no difference in the density between the first printing and the second printing to be obtained.

What is claimed is:

1. A thermal transfer sheet for repeated printing cycles, comprising:

a substrate film;

a first ink layer formed on at least one surface of said substrate film, said first ink layer comprising a binder and a colorant; and a second ink layer formed on said first ink layer, said second ink layer comprising a binder and a colorant;

wherein the time required for said first ink layer to solidify after melting is shorter than that for said second ink layer.

2. A thermal transfer sheet for repeated printing cycles according to claim 1, wherein said first ink layer and said second ink layer each enters a molten state when heated up to 120° C., and a difference in the solidification time between said first ink layer and said second ink layer is in a range of from 4 to 8 mins. as measured in terms of a time taken for the ink layer to solidify from the molten state at a temperature of 120° C. when it is cooled at a rate of 7.5° C./min.

3. A thermal transfer sheet for repeated printing cycles according to claim 1, wherein said first ink layer enters a molten state when heated up to 120° C., and the solidification time for said first ink layer is 8 mins. or less as measured in terms of a time taken for said first ink layer to solidify from the molten state at a temperature of 120° C. when it is cooled at a rate of 7.5° C./min.

4. A thermal transfer sheet for repeated printing cycles according to claim 1, wherein said first ink layer comprises a colorant and a binder, and said second ink layer comprises a colorant and a binder comprising a plasticizer and a thermoplastic resin.

5. A thermal transfer sheet for repeated printing cycles according to claim 4, wherein the thermoplastic resin of said second ink layer comprises a nitrocellulose resin.

6. A thermal transfer sheet for repeated printing cycles, comprising:

a substrate film;

a first ink layer formed on at least one surface of said substrate film, said first ink layer comprising a colorant and a binder; and a second ink layer formed on said first ink layer, said second ink layer comprising a colorant and a binder comprising a plasticizer and a thermoplastic resin.

7. A thermal transfer sheet for repeated printing cycles according to claim 6, wherein the thermoplastic resin of said second ink layer comprises a nitrocellulose resin wherein the time required for said first ink layer to solidify after melting is shorter than that for said second ink layer.

* * * * *